(12) United States Patent
Rodriguez (10) Patent No.: US 9,092,433 B2
(45) Date of Patent: Jul. 28, 2015

(54) LAYERED ABSTRACTION SYSTEMS AND METHODS FOR PERSISTENT CONTENT IDENTITY

(75) Inventor: Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1188 days.

(21) Appl. No.: 12/059,954

(22) Filed: Mar. 31, 2008

(65) Prior Publication Data

US 2008/0270575 A1 Oct. 30, 2008

Related U.S. Application Data

(60) Provisional application No. 60/909,368, filed on Mar. 30, 2007.

(51) Int. Cl.
*G06F 21/00* (2013.01)
*G06F 17/30* (2006.01)

(52) U.S. Cl.
CPC .................. *G06F 17/30038* (2013.01)

(58) Field of Classification Search
CPC .................. G06F 15/16; H04L 9/32
USPC .................................. 709/217–219
See application file for complete search history.

(56) References Cited

U.S. PATENT DOCUMENTS

| | | | |
|---|---|---|---|
| 6,505,160 B1* | 1/2003 | Levy et al. ................ | 704/270 |
| 2002/0033844 A1* | 3/2002 | Levy et al. ................ | 345/744 |
| 2002/0082997 A1* | 6/2002 | Kobata et al. ............. | 705/51 |
| 2002/0120849 A1* | 8/2002 | McKinley et al. ........ | 713/176 |
| 2002/0188841 A1* | 12/2002 | Jones et al. ............... | 713/153 |
| 2004/0181490 A1* | 9/2004 | Gordon et al. ............ | 705/59 |
| 2005/0251683 A1* | 11/2005 | Levy et al. ................ | 713/176 |
| 2006/0062426 A1* | 3/2006 | Levy et al. ................ | 382/100 |
| 2008/0155116 A1* | 6/2008 | Schmelzer ................ | 709/232 |

* cited by examiner

*Primary Examiner* — Harunur Rashid
(74) *Attorney, Agent, or Firm* — Digimarc Corporation (57) ABSTRACT

This invention generally relates to methods and systems for associating and identifying content, including both physical and electronic objects, with metadata through networks. The invention also generally relates to routing systems for handling requests including content identifiers. One claimed method is provided for media content identity resolution. The method includes: computing a content identifier from a media content signal; forming a layered content identifier, the layered content identifier including the content identifier, an identity provider identifier and a metadata claim; issuing a resolution request to a routing service to get metadata associated with the layered content identifier, the routing service interpreting the layered content identifier by forwarding the metadata claim to an identity provider identified by the identity provider identifier; and receiving in response to the resolution request, the metadata associated with the layered content identifier. Of course, other combinations are provided and claimed as well.

15 Claims, 4 Drawing Sheets

IP = Identity Provider
X = Unresolved Metadata Claims
M = Resolved Metadata Claims
P = Private Data

FIG. 7

LAYERED ABSTRACTION SYSTEMS AND METHODS FOR PERSISTENT CONTENT IDENTITY

RELATED APPLICATION DATA

This application claims the benefit of U.S. Provisional Patent Application No. 60/909,368, filed Mar. 30, 2007.

This application is also related to assignee's U.S. patent application Ser. No. 11/208,441, filed Aug. 19, 2005 (published as US 2006-0062426 A1), Ser. No. 11/614,921, filed Dec. 21, 2006 (published as US 2007-0156726 A1) and Ser. No. 11/614,947, filed Dec. 21, 2006 (published as US 2007-0208711 A1).

Each of the above-mentioned patent documents is hereby incorporated by reference.

TECHNICAL FIELD

The invention relates generally to methods, apparatus and systems for associating and/or identifying content (including physical and/or electronic objects) with metadata through networks. The invention also relates generally to routing systems for handling requests including content identifiers.

BACKGROUND AND SUMMARY

One embodiment of the invention relates to obtaining metadata that is associated with content. The term metadata is broadly used in this patent document and may include, e.g., data that describes content, quality, condition, origin, and other characteristics of data (e.g., a song or video title, an artist's name, related songs or content, copyright information, online purchase information, links to other information or websites, ownership information, etc.) The term "content" also may encompass a wide variety of items including, e.g., audio, video, imagery, and other electronic content items. Sometimes we use the terms "media", "media content" and even "signal" to describe "content."

Returning to the above mentioned embodiment, a "content identifier" may be computed from a content signal. A content identifier is a value or number used to identify the content. There are numerous ways to compute a content identifier. For example, digital watermarking may be used. Most commonly, digital watermarking is applied to media such as images, audio signals, and video signals through slight variations to sample values of the media. For example, the variations may be introduced to samples in a so-called orthogonal domain (also termed "non-perceptual," e.g., MPEG, DCT, wavelet, etc.) or in quantization values, pixel values, audio samples, or data representing such. The assignee's U.S. Pat. Nos. 5,862,260, 6,122,403 and 6,614,914 are illustrative of certain digital watermarking technologies and are each hereby incorporated by reference. We also expect that so-called "fingerprinting" can be used to determine a CID. A fingerprint (e.g., a hash, derived signature or reduce-bit representation of content) statistically identifies content item.

Once a content identifier if obtained, as discussed above, a "layered content identifier" can be formed. A layered content identifier preferably includes the content identifier (discussed above), an "identity provider identifier" and a "metadata claim." The "identity provider identifier" is a value or number that identifies an "Identity Provider". An Identity Provider is a party, entity or system that provides identity preferably in the form of, e.g., metadata related to content, typically in adherence with predetermined direction and business rules. A "metadata claim" may include, e.g., metadata or data indicating a preferred format or scheme for metadata when obtained or supplied.

Again, returning to the above embodiment, a resolution request is issued to a routing service to obtain metadata associated with the layered content identifier. The routing service interprets the layered content identifier by, e.g., forwarding the metadata claim to an identity provider identified by the identity provider identifier. Then, in response to the resolution request, the metadata associated with the layered content identifier is received.

Before discussing additional and alternative embodiments, a few items of background are informative.

Generally, information exists if it has been "acted upon" (e.g., interpreted, internalized, inferred; see also, dissected, etc.) to gain understanding. One example of how this is accomplished is based on an existence of metadata associated with the information, whether it be implicit and/or explicit, that allows an observer to climb a semantic stack and place the metadata information within an ontological model. For discussion, let's assume the following premise:

(n) information: a message received and understood

Information as represented in image, audio and video content, is of immeasurable value, but is regularly disseminated with incomplete (or incorrect) metadata that is essential to gain understanding of the content, be it for an end user or an associated infrastructure, e.g., the Semantic Web. (The Semantic Web includes an extension of the World Wide Web in which semantics of information and services are defined, helping to understand and fulfill requests from people and machines to use web content.)

What is needed is a mechanism to identify content and provide appropriate metadata to enable interpretation and action at increasingly higher layers in a semantic stack, e.g., from operations on raw data to execution of business rules. A related discussion on business rules is found, e.g., in assignee's U.S. patent application Ser. No. 11/614,947, filed Dec. 21, 2006 (published as US 2007-0208711 A1).

For small volumes of content that are relatively static, Operating System (OS) constructs such as filenames, icons, etc., are typically used to carry metadata that is "self identifying", for example, a picture may be named "FamilyVacation2007.mpg". As the volume of content increases, OS constructs are relegated to identifying labels that can be acted upon to extract metadata from an implemented system/file format, such as with an asset management system or from a file format that supports metadata (e.g., XMP, etc.)

To enforce binding an actionable "label" (e.g., a content identifier) to content, and to an implemented system for the retrieval of metadata, cryptographic constructs have been used in the form of traditional Digital Rights Management systems (DRM). DRM systems allow content owners to determine where/when content is accessed (e.g., decrypted), providing an opportunity to help ensure that appropriate infrastructure is in place to make the label actionable.

To contend with the existence of multiple DRM solutions, efforts are underway to provide DRM interoperability in hopes that content labels remain actionable and metadata can be retrieved/distributed across DRM boundaries (e.g., DRM interoperability project "Coral," etc.), but progress has been slow.

Assuming the efforts are successful, these techniques are still reliant on the identifying label (e.g., filename, header, or other out-of-band information, etc.) remaining intact, something that rarely occurs once the content is publicly available.

Also, the reality that all content is ultimately consumed in an analog form that strips away any of the delivery and labeling constructs, creates the ever present threat that content may be re-captured and a new digital instance of the content created, with the instance likely missing or having incorrect metadata and incorrect (or missing) labels.

One result is that a significant volume of content cannot be accurately identified, greatly complicating attempts to manage/leverage the content and ultimately leading to confusion, frustration and lower rates of consumption by consumers.

One challenge then is to create an infrastructure that provides information in the form of identifying metadata from the content itself, independent of representation and environment.

We return now to additional embodiments of the invention.

In one embodiment, a layered approach is provided, where identifying metadata is provided by a tiered set of components, each building on the services (or information) offered or provided by a lower layer. One result includes an ecosystem, a "Content ID System," that specifies labels (e.g., a Content ID) and infrastructure to arrive at an implemented system that is open, scalable and content agnostic.

In another embodiment, a method for media content identity resolution is provided. The method includes: computing a content identifier from a media content signal; forming a layered content identifier, the layered content identifier including the content identifier, an identity provider identifier and a metadata claim; issuing a resolution request to a routing service to get metadata associated with the layered content identifier, the routing service interpreting the layered content identifier by forwarding the metadata claim to an identity provider identified by the identity provider identifier; and receiving in response to the resolution request, the metadata associated with the layered content identifier.

In yet another embodiment, a computer readable medium on which is stored instructions comprising a metadata client is provided. The metadata client includes: an external interface including a content interface for receiving a content signal and a request to provide metadata associated with the content signal, and a metadata interface for providing metadata associated with the content signal; and an internal interface including an identity provider interface for integrating an identity provider driver into the metadata client, the identity provider driver operable to compute a content identifier from the content signal and provide the content identifier to the metadata client. The metadata client invokes the identity provider driver through the internal interface to request the content identifier, and the metadata client provides the metadata associated with the content signal via the content identifier through the metadata interface.

The foregoing features, embodiments and advantages will be even more readily apparent from the following detailed description, which proceeds with reference to the accompanying drawings. Of course, additional combinations and embodiments are provided as well.

DETAILED DESCRIPTION OF THE INVENTION

Content ID System

A Content ID System may perform many actions including, e.g.: i) read/form actionable labels (e.g., a Content ID ("CID")); ii) retrieve/parse metadata based on CIDs; and iii) enable applications. These actions may occur within an ecosystem that balances the needs of primary actors in a distribution channel and in support of, e.g., one or more of the following goals:

Content/Metadata owner management of meta-data.
Minimal disclosure of meta-data for a defined use.
Justifiable parties (security between elements in the ecosystem).
Pluralism of Identity Providers and technologies.
Human integration, incorporating content owners for sensitive applications such as take down notices, warnings, legal actions, etc.
Consistent experience across contexts for end users.
Support for fluid migration from proprietary sources of identity and metadata to fully federated embodiments.

To achieve one or more of these goals, three functional layers are identified in Table 1, below. Of course, additional layers may be provided, and functionality of one layer may be distributed between several different layers. Thus, this example should not limit the scope of this embodiment of the invention.

In the embodiment described in Table 1, layers build on each other and share common characteristics with other layered, abstraction models such as the, e.g., data, session and application layers in an OSI Model ("Open Systems Interconnection Basic Reference Model"). In Table 1, each layer may implement an opaque interface, fostering interoperability and enabling multiple parties to interact with the layer.

TABLE 1

| System Layers | Functional Layer | Responsibility: | Examples/Related Technologies |
|---|---|---|---|
| 3 | Applications | Applications for content media management | Searching, Content Filtering, Audience Measurement, etc. |
| 2 | Content ID Services | Routing and registration services for Content IDs, resulting in management and retrieval of metadata | DNS, EPCNET, Handle System, PURL, URN, etc. |
| 1 | Content ID | Enroll/embed/analyze content, resulting in content identification implementations that provide | Digital Watermarking, Fingerprinting, Image Classification, Tagging, |

TABLE 1-continued

| System Layers | Functional Layer | Responsibility: | Examples/Related Technologies |
|---|---|---|---|
| | | actionable labels in the form of Content ID's based on a specific instance of content, or content generally. | Natural Language, etc. |

Roles

Identifying roles of existing entities involved in content management & distribution is helpful when describing how a Content ID System can be leveraged. A Content ID System may be implemented to reflect these roles by providing components that provide the appropriate functionality while minimizing impact to workflow.

Figure 1:
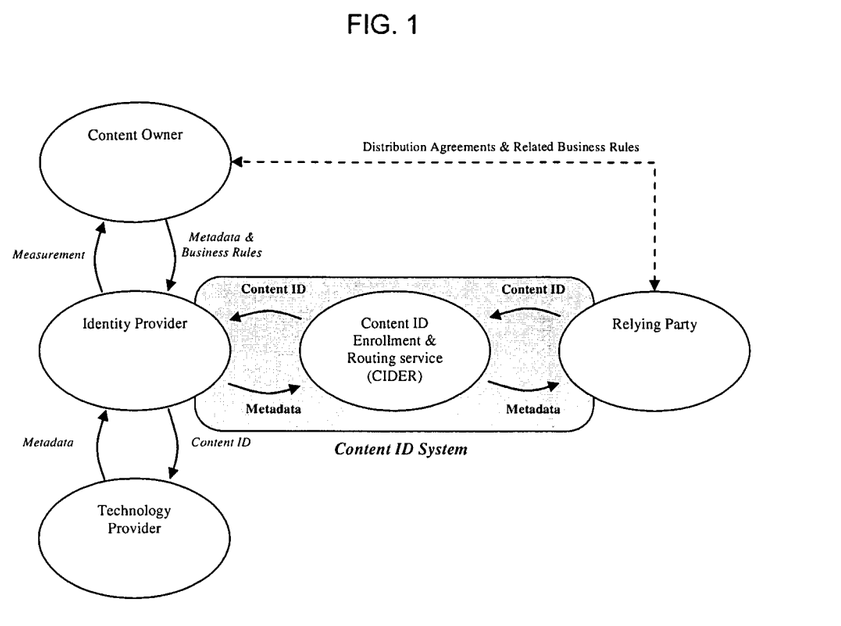
FIG. 1 illustrates interaction with a Content ID System.

For example, and with reference to FIG. 1, the following parties (or systems) are shown:
  Content Owner (CO)
    Leverages an Identity Provider in support of specific media and application scenarios, managing metadata and routing business rules (e.g., studios and other content providers). A Content Owner owns or controls content and/or its associated metadata, and may provide direction and business rules for its content.
  Identity Provider (IP)
    Provides identity in the form of, e.g., metadata related to a Content ID in adherence with Content Owner direction and business rules.
  Relying Party (RP)
    Distributor of content (e.g., User Generated Content ("UGC") Operators, creator of Peer-2-Peer clients, etc.) that benefits from accurate metadata for specific instances of content.
  Technology Provider (TP)
    Content identification component or service provider leveraged by and/or used by Identity Provider in support of identity services. One technology component is a digital watermarking component; another component is a fingerprinting generator component (e.g., where a Content ID is derived from the content itself, like a hash or other reduce-bit identifier). Other content identification technologies are also known to those of ordinary skill in the art.
  Content ID Enrollment & Routing Service (CIDER)
    Routing service, directing Content IDs to appropriate Identity Providers for resolution (e.g., DNS for Content ID's), etc.
Functional Components The Content ID System may be implemented using any number of technologies, languages, platforms, etc., as long as they support the functional interfaces defined by a predetermine standard or specification. For example, a standard may include tags or payload field identification, format, structure, etc. How the system is packaged and in what granularity can also be influenced by the roles discussed above. Still, the system must include a Content ID. The Content ID represents identity of content within the system.

Content ID

Figure 2:
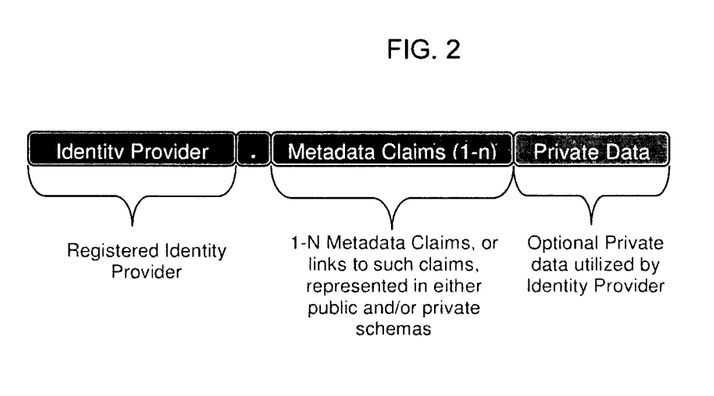
FIG. 2 illustrates one example of a layered content identifier.

A Content ID ("CID" or "layered content identifier") represents, includes or otherwise provides a First Class Name of a specific instance of content at whatever granularity is needed and/or enabled by a lower lever identification technology. This takes the form of one or more metadata claims that consist of either metadata itself or pointers to additional metadata. One Content ID format is shown in FIG. 2 and may include, e.g., the following fields. Of course, a Content ID may also include a separate field for a content identifier, e.g., an identifier derived from the media itself (fingerprint or watermark identifier).

Identity Provider Identifier: Identifying number, value or characteristic for a specific Identity Provider enrolled in the Content ID System.
    Examples:
      121=Digital Cinema Identity Services offered by XCinea
      87=Connected Content Identity offered by Digimarc
      A&#=identifying an open or other standard rule repository
      N-bit alphanumeric value=unique value associated with a party or system that is enrolled in the Content ID System.
  Metadata Claims One or more metadata claims represented in public or private schemas or pointers to such metadata claims.
    Examples:
      A 32 bit opaque pointer to DDEX information provided by an Identity Provider and 8 bits of access control flags.
      128 bit audio fingerprint.
      96 bit ISAN and 4 bits of rating flags.
      64 bit pointer Identity Provider to return 96 bit EPC-NET payload.
      N-bits associated with various business rule, where N is an integer.
      M-bits associated with a particular DRM system, where M is an integer.
  Private Data One or more metadata claims represented in public or private schemas or pointers to such metadata. Private data may be shielded from view, interpretation or parsing so that only certain parties (or layers) can interpret such private data.
    Examples:
      32 bit opaque pointer to ISAN information provided by Identity Provider+8 bits of access control flags.
      96 bit ISAN+4 bits of rating flags Thus, a Content ID may include different fields (e.g., Identify Provider, Metadata Claims, and Private Data). In one example, a Relying Party (FIG. 1) decodes or otherwise obtains a content identifier (e.g., decodes a digital watermark payload or calculates a fingerprint). The content identifier may be used as a portion of a Metadata Claim. An Identity Provider is identified (e.g., a Provider associated with a particular content identifier technology or with a particular client device). This information—perhaps with other information—is combined to form a CID. The CID is forwarded to a CID Router (e.g., the "CIDER" as shown in FIG. 1), which uses the Identity Provider identifier to determine (e.g., via a database lookup) where to forward the CID, and after so determining, forwards the CID to the Identity Provider. The Identity Provider uses information from the CID to provide or look up other related metadata and provides this information back to the CID Router for forwarding onto the Relying Party.

In some cases the Identity Provider communicates this metadata directly back to the Relying Party. (The Identity Provider may hand CIDs and associated requests according to business rules or other restrictions including in the CID or looked-up based on information contained in the CID.)

Of course, these examples are not meant to limit the scope of the invention. Indeed, a Content ID can carry any combination of metadata and private data, at varying levels of resolution and granularity.

As discussed above, a CID Router is provided a Content ID by a Relying Party. The CID Router uses an Identity Provider identifier in a CID to identify an Identity Provider, the remainder of the CID is preferably passed through to the Identity Provider with no attempt to parse or interpret either the Metadata Claims or Private Data. Indeed, this aspect differentiates this system from other routing system which may try to interpret, parse or otherwise act on metadata (e.g., content identifiers) contained in requests.

Referring now to Table 1, a CID can be generated by layer 1 of a CID system and passed upwards to layer 2 for routing and resolution of Metadata, similar to an IP address being routing via DNS server to arrive at specific web page. The metadata is then provided back to a relying party to be used in accordance with predetermined (or default) business rules. Examples of business rules are provided in, e.g., assignee's U.S. patent application Ser. No. 11/614,947, filed Dec. 21, 2006.

Figure 3:
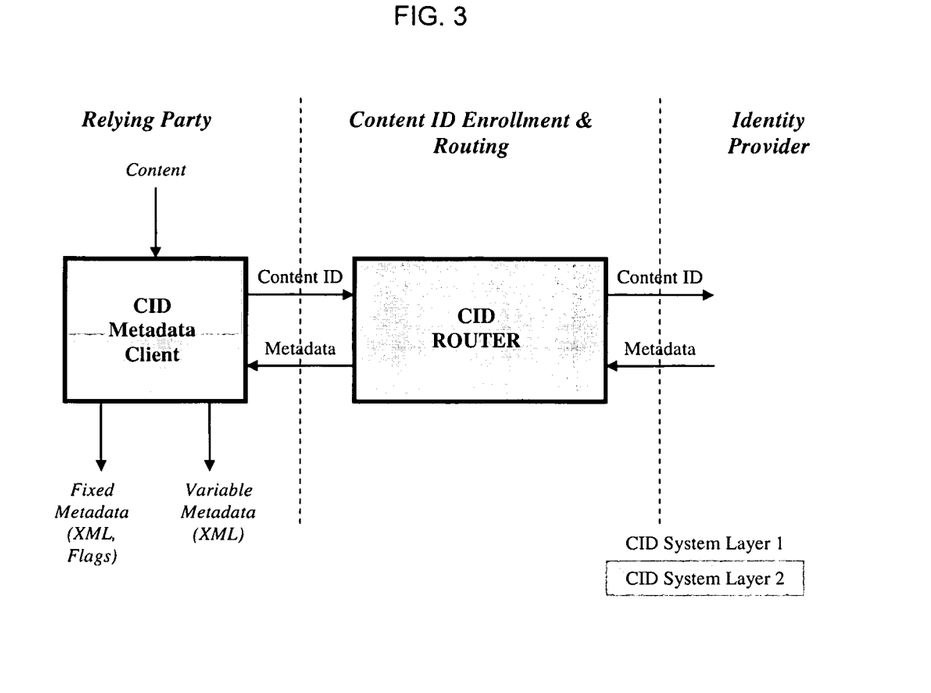
FIG. 3 illustrates a CID Metadata Client and a CID Router, and various interactions.

With reference to FIG. 3, a system is shown including at least two Content ID system components, e.g., packaged as web services. These system components may be a CID Metadata Client (e.g., executing within a domain of a Relying Party) and a CID Router (e.g., executing within the Content ID Enrollment and Routing service).

Of course, an application layer (Layer 3) may interface, interact or even call the CID metadata Client and/or CID Router. This interaction is not shown in FIG. 3.

CID Metadata Client

The CID Metadata Client may include a public and tangible portion of the CID system. The CID Metadata Client may sit or reside, e.g., with a Relying Party, which is typically remote from the CID Router. Indeed, whereas a CID Router may include a web service operating remotely, the CID Metadata Client can be widely deployed and may take on many implementations, e.g., from lightweight libraries to be integrated into a P2P client to highly optimized, scalable server-based services intended to exist at point of ingest with UGC operators.

The CID Metadata Client may provide a singular, stable interface to the Relying Party. The CID Metadata Client may export different classes of interfaces to (or for) a Relying Party Content, Metadata and Communication.

Content Interface: For a client to provide identity in the form of a CID for an instance of content, it preferably includes access to content. This may take on many forms, from a file-based interface in which the client opens and parses various content file types (e.g., MP3, MPG, etc.) to a streaming interface where sessions are initiated and content is streamed in various forms to client (e.g., I frames, MPEG elementary stream, etc.)

Metadata Interface: While two metadata interfaces are discussed here, many more may be implemented: i) a first class of interface supports known schemas for applications such as play control, content filtering, etc. This may take the form of control flags, ratings information, etc; ii) a second class of interface provides an opaque interface to metadata represented as in a standard format, e.g., XML or other format, allowing any types of metadata to be provided.

Communication Interface: In some embodiments, the client may be required to communicate with a CID Router to resolve Metadata Claims; if so, some type of network connectivity is preferred. Depending on the implementation a Relying Party may need to provide programmatic access to network resources, such as when integrating the CID Metadata Client into a P2P implementation. And in server and other implementations the Relying Party may never be exposed to the Communication Interface as network access is implicit.

CID Metadata Client Extensibility

Relying Parties preferably integrate only a singular component to identify content, regardless of underlying technology leveraged. To facilitate this, an extensible approach can be used that allows a CID Metadata Client to leverage new technologies without changing its existing interface.

Figure 4:
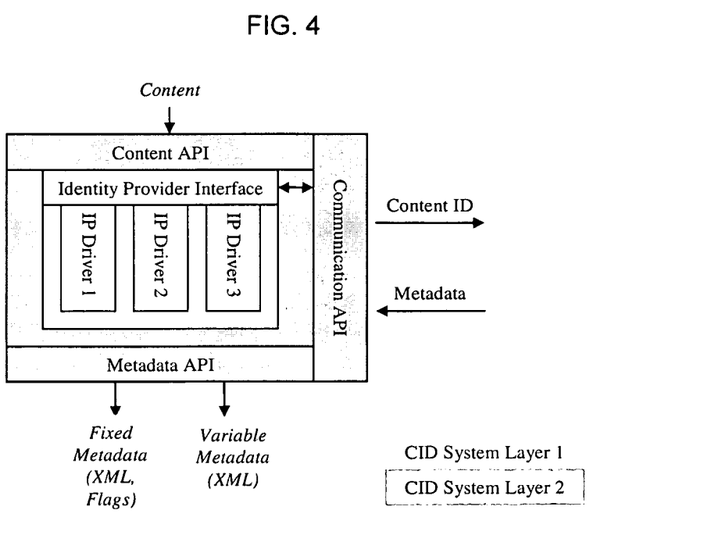
FIG. 4 illustrates an internal interface.

With reference to FIG. 4, an internal interface, e.g., an Identity Provider Interface (IPI) is provided, allowing components from Identity Providers to be plugged-into an existing CID Metadata Client implementation, ideally at run time. The IPI can be thought of as roughly analogous to a Service Provider Interface for sockets and the IP Drivers similar in functionality to a mini-driver within the Windows UniDriver architecture.

These components, or Identity Provider Drivers, would encapsulate functionality of Layer 1, or the ability to create a valid CIDs based on the presence of content. One example of an Identity Provider component is a digital watermark detection component provided by a digital watermark Technology Provider. Another Identity Provider component is a fingerprinting generator component provided by a fingerprinting Technology Provider. Of course, there are other components that can be interchanged here as well. (This illustrates my thought that a content user really doesn't care which technology is used to identify his content. Rather, the content user will rely on an Identity Provider to obtain one or more identifying mechanism and plug-and-play them in the system.)

The CID Metadata Client's communication with IP Drivers can be accomplished through the TPI, which is meant to be opaque, hiding the details of the CID generation process from the client.

CID Router

In addition to the discussion of the CID Router above, a CID Router may work in conjunction with a sibling service, a CID Enrollment Service. Analogous to the architecture of DNS, a CID Router can provide routing services through a single node or a network of routing nodes that are kept in synchronization.

Some embodiments may include web services supporting a common public web interface (e.g., SOAP, XML-RPC, etc.), which are loosely coupled and may be operating from within the domain of an Identity Provider. In other embodiments, a central CID Router facilitates real-time resolution and fosters enrollment of Identity Providers. As traffic grows, local implementations may also be used for Relying Parties that generate significant traffic and for whom caching requests is advantageous.

In most embodiments, the CID Router will not store metadata, but may leverage caching schemes to increase performance. Such caching schemes may be optionally limited by constraints put forth by metadata owners, such as limiting the time-limits to be cached; limiting what types of metadata may be cached, etc.

Content ID Resolution Sequence

The CID Metadata Client and CID Router together drive and resolve CID requests through their various roles in the ecosystem. At each step along the way, Metadata Claims can be leveraged if the schema is known and/or they are resolved to enable further interpretation.

Figure 5:
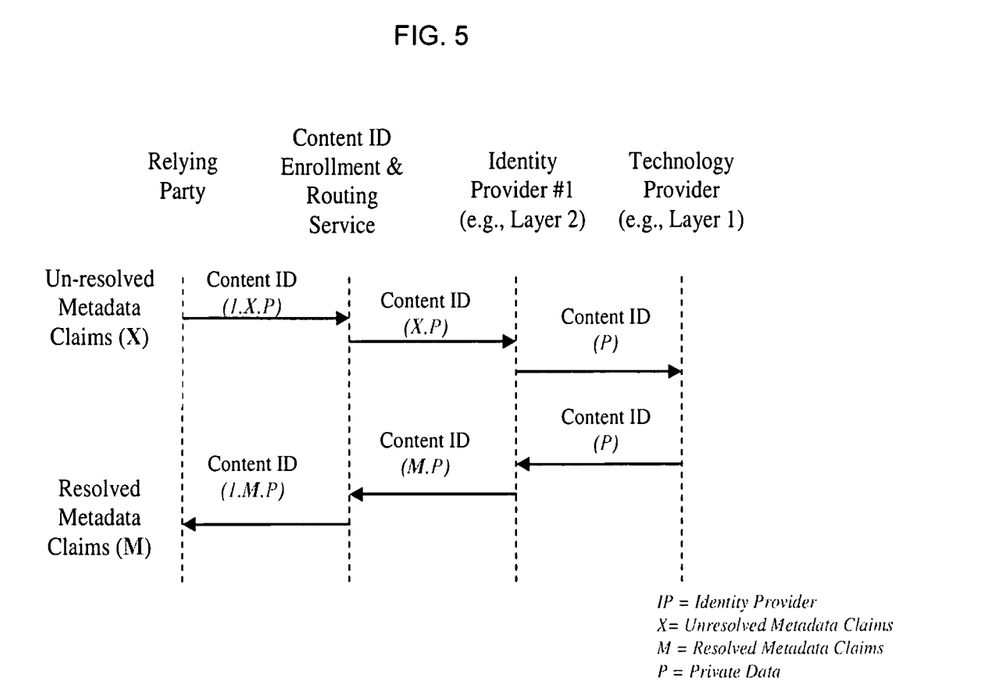
FIG. 5 illustrates application layer interaction.

An Application layer (e.g., a layer 3) may interact and/or call the various illustrated services in FIG. 5.

Content ID Deployment

Similar to digital identity, most existing identity solutions are monolithic, such as with the Passport system from Microsoft. Currently Relying Parties and Content Owners are likely the same entity for many applications and identity is provided by vendors that combine the functionality of an Identity Provider & Technology Provider.

While there will likely always be a need for closed content identity systems for specific applications, either for reasons of legacy infrastructure, legislation, etc., the goal however is that over time the Content ID System become a de-facto standard.

Eventually those applications that allow for co-location of roles within the same entity, such as pre-release content, asset management, etc. also should be considered. Doing so will allow the higher-level interfaces and functional assumptions to be validated, without fully implement aspects of Layers 1 & 2 for full technical interoperability.

Figure 6:
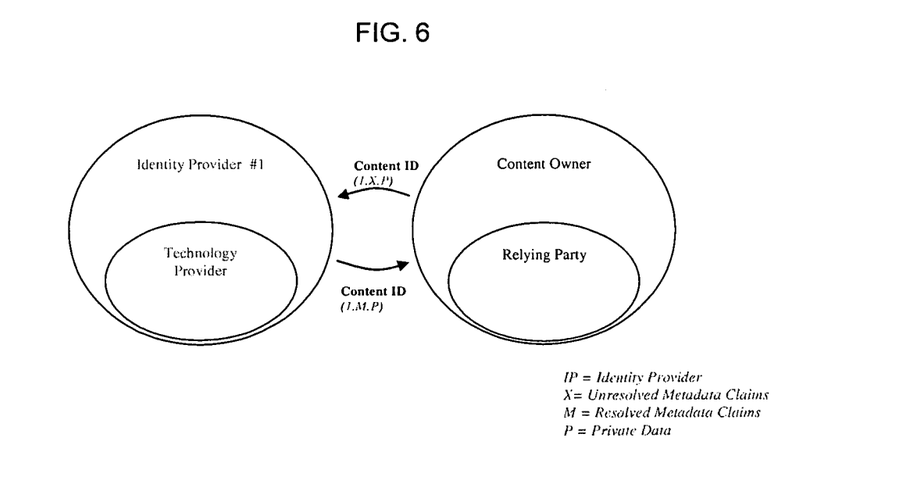
FIG. 6 illustrates one example of integration of Identity Providers and Content Owners.

As other applications emerge, a Relying Party as shown in FIG. 6, will likely represent third parties involved in the distribution and consumption of content, benefiting, perhaps, from a federated approach. See, e.g., Ser. No. 11/614,947, filed Dec. 21, 2006 for a related discussion (published as US 2007-0208711 A1). An Identity Provider (#1) may include or closely cooperate with a Technology Provider, and the Content Owner may include or closely cooperate with a Relying Party. Metadata claims can be requested and resolved through communication between such parties.

Figure 7:
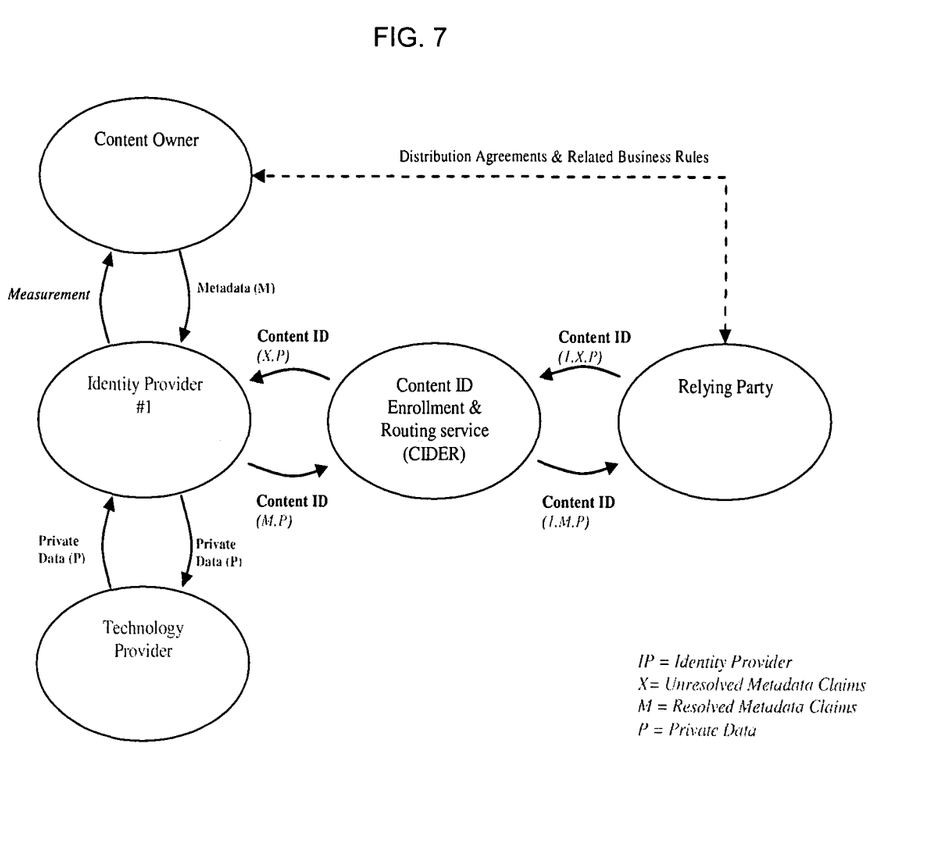
FIG. 7 illustrates communication paths (and data) relative to FIG. 1.

FIG. 7 illustrates even more detailed communication paths relative to FIG. 1. For example, private data carried by a layered content identifier can be communicated between and Identity Provider and a Technology Provider. FIG. 7 shows additional communication paths as well.

A broad array of Relying Parties will be become enabled with a Content ID System. Content distributors and Search Engine operators (by way of example) can adopt such a system to fulfill the promise of the Semantic Web, ease navigation of long-tail content and optimize implementation of business rules.

Additional Details

A Relying Party may include a Fingerprint generator to derive an identifier. For example, a CID Metadata Client may include or cooperate with such a generator, and may include a generated fingerprint identifier as at least a portion of the Metadata Claims in a CID. A Relying Party may also include a watermark decoder to decode an identifier from content. For example, a CID Metadata Client may include or cooperate with a watermark detector to decode a watermark from a content item. Some or all of a decoded watermark identifier can be included as a portion of a Metadata Claim in a CID.

A Relying Party may, of course, include both fingerprinting and watermarking functionality.

Concluding Remarks

Having described and illustrated the principles of the technology with reference to specific implementations, it will be recognized that the technology can be implemented in many other, different, forms. To provide a comprehensive disclosure without unduly lengthening the specification, applicants hereby incorporate by reference each of the U.S. Patent documents mentioned above.

The various section headings in this document are provided for the reader's convenience and provide no substantive limitations. Of course, the subject matter under one section can be readily combined with the subject matter under another section.

The methods, processes, and systems described above may be implemented in hardware, software or a combination of hardware and software. For example, the watermark data decoding processes may be implemented in a programmable computer or a special purpose digital circuit. Similarly, watermark data decoding may be implemented in software, firmware, hardware, or combinations of software, firmware and hardware. The methods and processes described above may be implemented in programs executed from a system's memory (a computer readable medium, such as an electronic, optical or magnetic storage device).

The various communication lines discusses above and in the figures may be carried out over local or remote networks, including, e.g., the internet, cellular (or other wireless) networks and intranets.

The particular combinations of elements and features in the above-detailed embodiments are exemplary only; the interchanging and substitution of these teachings with other teachings in this and the incorporated-by-reference US patent documents are also contemplated.

What is claimed is:

1. A method for media content identity resolution comprising:

using a configured processor, computing a content identifier from a media content signal, in which the content identifier is computed from the media content signal using a persistent content identification technology obtained from a first technology provider, in which the content identifier is decoded from digital watermarking hidden in the media content signal;

forwarding the content identifier to the first technology provider, and in response to said forwarding, receiving metadata from the first technology provider that enables an identity provider—which is different than the first technology provider—to provide metadata about the media content signal that is used to identify the media signal;

forming a layered content identifier, the layered content identifier including the content identifier, an identity provider identifier and a metadata claim;

issuing a resolution request to a routing service to obtain metadata associated with the layered content identifier, the routing service interpreting the layered content identifier by forwarding the metadata claim to an identity provider identified by the identity provider identifier; and receiving metadata associated with the content identifier from the identity provider in accordance with business rules, the business rules associated with the layered content identifier or with the identity provider.

2. The method of claim 1 wherein the metadata claim comprises a pointer to metadata.

3. The method of claim 1 wherein the metadata claim includes an access control flag.

4. The method of claim 1 wherein the metadata claim includes a ratings flag.

5. The method of claim 1 wherein the routing service is accessed over a wireless network.

6. An apparatus comprising:

memory for storing a media content signal;

a processor programmed for:

computing a content identifier from the media content signal, in which the content identifier is computed from the media content signal using a persistent content identification technology obtained from a first technology provider, and in which the content identifier is decoded from digital watermarking hidden in the media content signal;

controlling forwarding the content identifier to the first technology provider, and in response to said forwarding, controlling receipt of metadata from the first technology provider that enables an identity provider—which is different than the first technology provider—to provide metadata about the media content signal that is used to identify the media signal;

forming a layered content identifier, the layered content identifier including the content identifier, an identity provider identifier and a metadata claim;

issuing a resolution request to a routing service to obtain metadata associated with the layered content identifier, the routing service interpreting the layered content identifier by forwarding the metadata claim to an identity provider identified by the identity provider identifier; and controlling receipt of metadata associated with the content identifier from the identity provider in accordance with business rules, the business rules associated with the layered content identifier or with the identity provider.

7. The apparatus of claim 6 wherein the metadata claim comprises a pointer to metadata.

8. The apparatus of claim 6 wherein the metadata claim includes an access control flag.

9. The apparatus of claim 6 wherein the metadata claim includes a ratings flag.

10. The apparatus of claim 6 wherein the routing service is accessed over a wireless network.

11. A non-transitory computer readable medium having instructions stored thereon, the instructions causing a processor to perform the following:

computing a content identifier from a media content signal, in which the content identifier is computed from the media content signal using a persistent content identification technology obtained from a first technology provider, and in which the content identifier is decoded from digital watermarking hidden in the media content signal;

forwarding the content identifier to the first technology provider, and in response to said forwarding, receiving metadata from the first technology provider that enables an identity provider—which is different than the first technology provider—to provide metadata about the media content signal that is used to identify the media signal;

forming a layered content identifier, the layered content identifier including the content identifier, an identity provider identifier and a metadata claim;

issuing a resolution request to a routing service to obtain metadata associated with the layered content identifier, the routing service interpreting the layered content identifier by forwarding the metadata claim to an identity provider identified by the identity provider identifier; and receiving metadata associated with the content identifier from the identity provider in accordance with business rules, the business rules associated with the layered content identifier or with the identity provider.

12. The non-transitory computer readable medium of claim 11 wherein the metadata claim comprises a pointer to metadata.

13. The non-transitory computer readable medium of claim 11 wherein the metadata claim includes an access control flag.

14. The non-transitory computer readable medium of claim 11 wherein the metadata claim includes a ratings flag.

15. The non-transitory computer readable medium of claim 11 wherein the routing service is accessed over a wireless network.

* * * * *